(12) United States Patent
Lee

(10) Patent No.: US 8,238,046 B2
(45) Date of Patent: Aug. 7, 2012

(54) LENS MODULE WITH ELECTROSTRICTIVE MEMBER FOR DRIVING LENES

(75) Inventor: Han-Lung Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 101 days.

(21) Appl. No.: 12/423,083

(22) Filed: Apr. 14, 2009

(65) Prior Publication Data

US 2010/0134896 A1   Jun. 3, 2010

(30) Foreign Application Priority Data

Nov. 28, 2008  (CN) .......................... 2008 1 0305858

(51) Int. Cl.
G02B 7/02 (2006.01)
(52) U.S. Cl. ......................... 359/819; 359/676
(58) Field of Classification Search .................. 359/676, 359/819, 824
See application file for complete search history.

(56) References Cited

U.S. PATENT DOCUMENTS

| 2006/0028743 A1* | 2/2006 | Yamashita et al. | 359/824 |
| 2009/0184605 A1* | 7/2009 | Chen | 310/357 |

* cited by examiner

*Primary Examiner* — James Greece
(74) *Attorney, Agent, or Firm* — Altis Law Group, Inc.

(57) ABSTRACT

An exemplary lens module includes a first lens, a second lens and an electrostrictive member. An optical axis of the second lens is aligned with that of the first lens. The electrostrictive member defines a through hole therein for facilitating light passing through, and is sandwiched between the first lens and the second lens. A thickness direction of the electrostrictive member is parallel to optical axes of the first lens and second lens. The electrostrictive member is capable of deforming in the thickness direction thereof when an electric current with an intensity is applied thereto, and capable of returning back to its undeformed state when the electric current is removed, whereby a space between the first and second lenses is adjusted, and at least one of the first lens and second lens is moved.

6 Claims, 3 Drawing Sheets

LENS MODULE WITH ELECTROSTRICTIVE MEMBER FOR DRIVING LENES

BACKGROUND

1. Technical Field

The present invention relates to lens modules, and particularly, to a lens module having a lens driving mechanism therein.

2. Description of Related Art

With ongoing developments of microcircuitry and multimedia technology, camera modules, including, for example, still camera modules and digital camera modules, are now in widespread use and are being combined with various electronic devices. These camera modules are usually required to have autofocus and zoom function.

Lens modules and image sensors are key components in camera modules. A typical lens module includes a lens assembly and a lens driving mechanism. The lens driving mechanism can be, e.g., a step motor configured for driving the lens assembly to move relative to the image sensor, or driving a single lens of the lens assembly to move, thereby achieving the autofocus or zoom function of the camera module. However, a typical step motor is heavy and bulky, and consumes a substantial amount of power, especially relative to the amount of power that can be stored in a typical battery system of a camera or an electronic device.

Therefore, there is room for improvement within the art.

BRIEF DESCRIPTION OF THE DRAWINGS

Many aspects of the present lens module can be better understood with reference to the following drawings. The components in the drawings are not necessarily drawn to scale, the emphasis instead being placed upon clearly illustrating the principles of the present lens module. Moreover, in the drawings, like reference numerals designate corresponding parts throughout the several views.

DETAILED DESCRIPTION OF EXEMPLARY EMBODIMENTS

Exemplary embodiments of the present lens module will now be described in detail below and with reference to the drawings.

Figure 1:
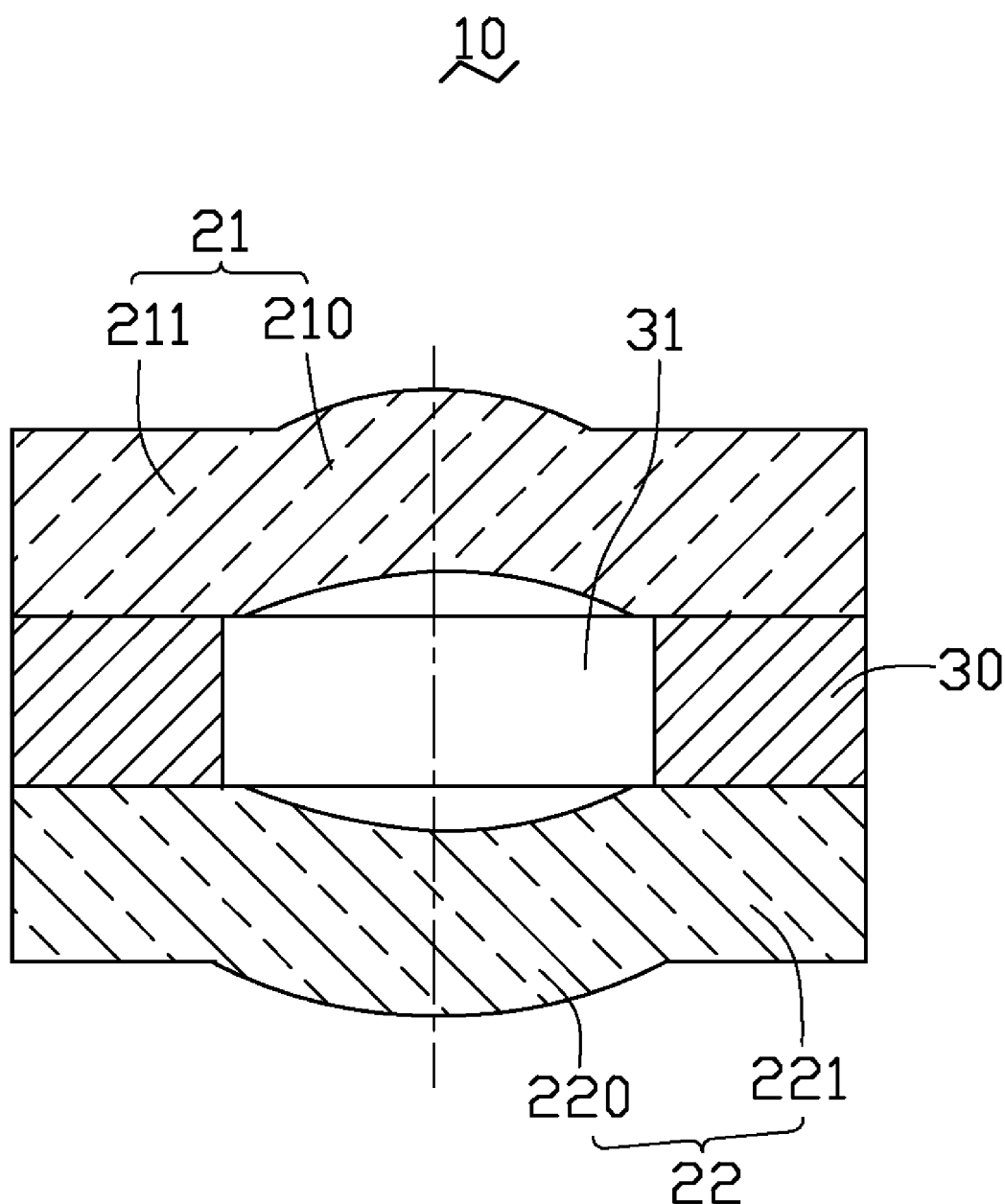
FIG. 1 is a schematic view of a lens module in accordance with a first exemplary embodiment, the lens module including an electrostrictive member sandwiched between lenses.

Referring to FIG. 1, an exemplary lens module 10 in accordance with a first exemplary embodiment, is shown. The lens module 10 includes a first lens 21, a second lens 22 and an electrostrictive member 30 sandwiched between the first lens 21 and the second lens 22. In present exemplary embodiment, the first lens 21, the second lens 22 and the electrostrictive member 30 are generally ring-shaped.

The first lens 21 has a central optical portion 210 and a peripheral portion 211 surrounding the central optical portion 210. The second lens 22 has a central optical portion 220 and a peripheral portion 221 surrounding the central optical portion 220. An optical axis of the first lens 21 is aligned with that of the second lens 22 (see dash line in FIGS. 1 and 2).

The electrostrictive member 30 is made from deformable materials, such as an artificial muscle material. The artificial muscle material may be, e.g., ferroelectric polymers or dielectric elastomers. Such artificial muscle materials are capable of deforming in a direction when an electric current with an intensity is applied thereto, and capable of returning back to its undeformed shape when the electric current is removed. A thickness direction of the electrostrictive member 30 is parallel to optical axes of the first lens 21 and the second lens 22. In the present exemplary embodiment, the electrostrictive member 30 is deformable in the thickness direction thereof. The electrostrictive member 30 has a first surface 301 and a second surface 302 on opposite sides in the thickness direction. The first surface 301 is adhered to the peripheral portion 211 of the first lens 21. The second surface 302 is adhered to the peripheral portion 221 of the second lens 22.

A through hole 31 is defined in a center of the electrostrictive member 30, for facilitating light passing through. A central axis of the through hole 31 is aligned with the optical axes of the first and second lenses 21, 22. In an alternative exemplary embodiment, the electrostrictive member 30 is transparent to light, and the through hole 31 is omitted.

Figure 2:
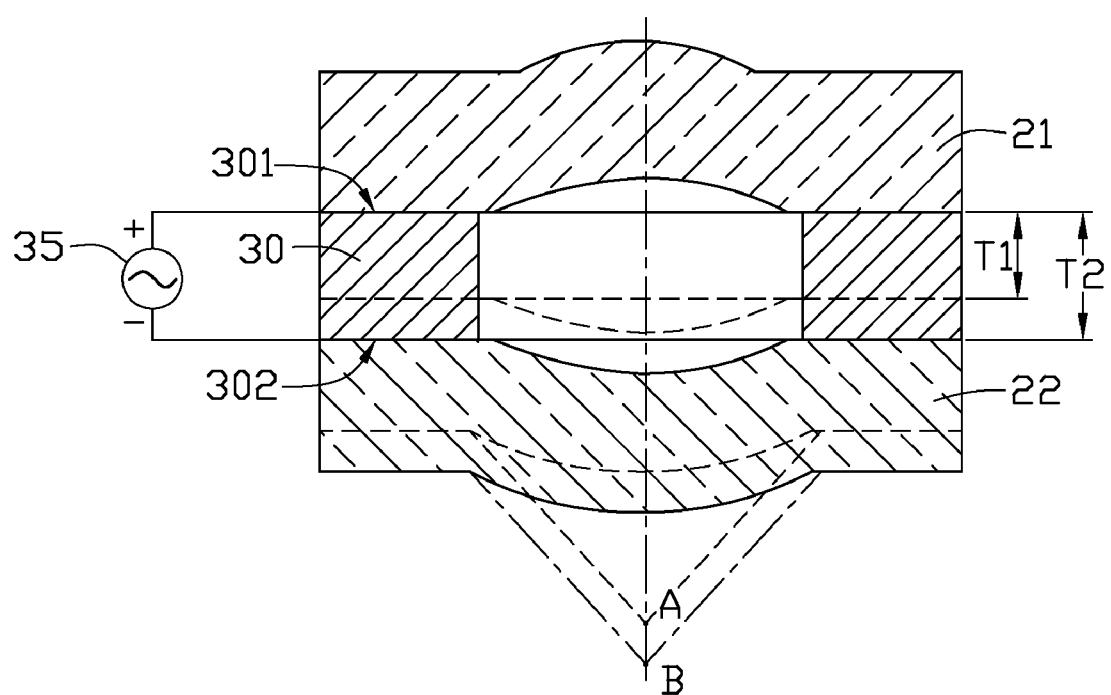
FIG. 2 is a schematic view showing a deformation of the electrostrictive member of FIG. 1, wherein a lens position and a focus point of the entire lens module are correspondingly changed.

Referring to FIG. 2, a deformation of the electrostrictive member 30 is shown when a power supply 35 provides an electric current to the electrostrictive member 30. The first surface 301 and the second surface 302 are electrically connected to a positive electrode and a cathode electrode of the power supply 35, respectively. In the illustrated embodiment, when the electrostrictive member 30 deforms, only the second lens 22 is moved. The broken lines in FIG. 2 show an original position of the second lens 22 and an original focus point A of the entire lens module when the electrostrictive member 30 is in T1 thickness. When the electrostrictive member 30 deforms from the T1 thickness to T2 thickness, a space between the first lens 21 and the second lens 22 is correspondingly increased, and the focus point of the entire lens module is changed from A to B. Preferably, a control unit (not shown) is provided to control an intensity of the electric current, such that the deformation degree of the electrostrictive member 30 can be changed. It is understood that, in an alternative exemplary embodiment, the electrostrictive member 30 is capable of driving the first lens 21 and the second lens 22 to move.

Figure 3:
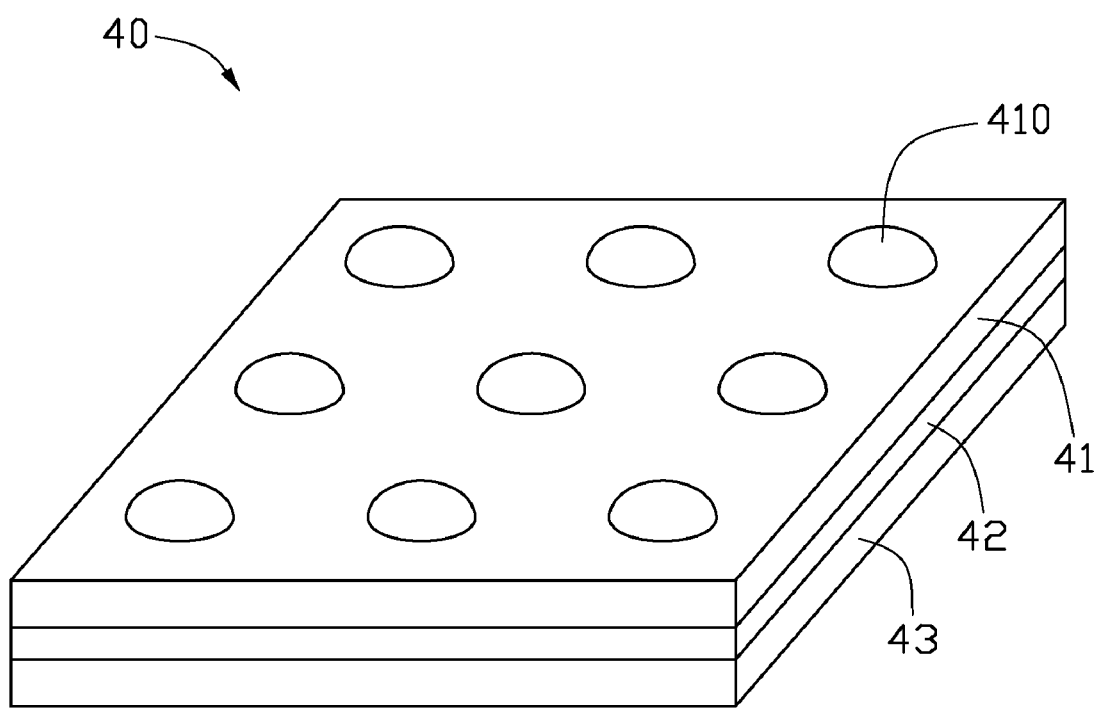
FIG. 3 is an isometric view of a lens module in accordance with a second exemplary embodiment.

Referring to FIG. 3, a lens module 40 in accordance with a second exemplary embodiment is shown. The lens module 40 includes a first lens array 41, a second lens array 43 and an electrostrictive member 42 sandwiched between the first lens array 41 and the second lens array 43. The first lens array 41, the second lens array 43 and the electrostrictive member 42 are generally square-shaped. The first lens array 41 includes a plurality of first lenses 410, the second lens array 43 includes the same quantity of second lenses (not shown), and the first lenses 410 align with the respective second lenses. The electrostrictive member 42 can have a plurality of through hole (not shown) therein, for facilitating light passing through.

It is understood that the above-described exemplary embodiments are intended to illustrate rather than limit the invention. Variations may be made to the exemplary embodiments without departing from the spirit of the invention. Accordingly, it is appropriate that the appended claims be construed broadly and in a manner consistent with the scope of the invention.

What is claimed is:

1. A lens module, comprising:
   a first lens;
   a second lens, an optical axis of the second lens being aligned with that of the first lens; and an electrostrictive member made from an artificial muscle material and defining a through hole therein for facilitating light passing through, and being sandwiched between the first lens and the second lens, the electrostrictive member having a first surface and a second surface on opposite sides thereof, the first surface directly adhered to the first lens, and the second surface directly adhered to the second lens, a thickness direction of the electrostrictive member being parallel to optical axes of the first lens and the second lens, the electrostrictive member deforming in the thickness direction thereof when an electric current with an intensity is applied thereto, and returning back to its undeformed state when the electric current is removed, whereby a space between the first and second lenses is adjusted, and at least one of the first and second lenses is moved relative to one another.

2. The lens module of claim 1, wherein the artificial muscle material is selected from the group consisting of ferroelectric polymers and dielectric elastomers.

3. A lens module, comprising:

a first lens;

a second lens, an optical axis of the second lens being aligned with that of the first lens;

an electrostrictive member made from an artificial muscle material located between and spacing the first lens and the second lens, the electrostrictive member having a first surface and a second surface on opposite sides thereof, the first surface directly adhered to the first lens, and the second surface directly adhered to the second lens, a thickness direction of the electrostrictive member being parallel to optical axes of the first lens and the second lens, the electrostrictive member deforming along the thickness direction thereof when an electric current is applied thereon, thereby driving at least one of the first and second lenses to move relative to one another; and a power supply being electrically connected to the electrostrictive member to provide the electric current to the electrostrictive member.

4. The lens module of claim 3, wherein the electrostrictive member has a through hole defined therein, a central axis of the through hole being aligned with the optical axes of the first lens and second lens.

5. The lens module of claim 3, wherein the artificial muscle material is selected from the group consisting of ferroelectric polymers and dielectric elastomers.

6. A lens module, comprising:

a first lens;

a second lens, an optical axis of the second lens being aligned with that of the first lens; and a transparent electrostrictive member sandwiched between the first lens and the second lens, such that light transmits through the first lens, the electrostrictive member, and the second lens, the electrostrictive member being made from a material selected from the group consisting of ferroelectric polymers and dielectric elastomers, the electrostrictive member having a first surface and a second surface on opposite sides thereof, the first surface directly adhered to the first lens, and the second surface directly adhered to the second lens, a thickness direction of the electrostrictive member being parallel to optical axes of the first lens and the second lens, the electrostrictive member deforming in the thickness direction thereof when an electric current with an intensity is applied thereto, and returning back to its undeformed state when the electric current is removed, whereby a space between the first and second lenses is adjusted, and at least one of the first and second lenses is moved relative to one another.

* * * * *